3,331,782
CURING PASTE
René P. Deltieure, East Brunswick, N.J., assignor to Thiokol Chemical Corporation, Bristol, Pa., a corporation of Delaware
No Drawing. Filed June 21, 1963, Ser. No. 289,743
14 Claims. (Cl. 252—186)

The present invention relates to novel polysulfide liquid polymer curing paste compositions, to novel curable polysulfide compositions containing said curing pastes, to the novel cured products obtained therefrom and to a novel process for stabilizing polysulfide liquid polymer curing paste compositions.

The liquid polysulfide polymers within the concept of the present invention are those materials having the essentially linear structure HS(RSS—R'—SS)$_x$R"SH wherein R, R' and R" may be the same or different hydrocarbon, oxahydrocarbon or thiahydrocarbon radicals. The preparation of these polymers is disclosed in U.S. 2,466,936. As disclosed in that patent, these polymers may also be prepared with crosslinking agents such as trichloropropane. The most preferred of these polymers according to the present invention are those having a molecular weight of about 2,000 to 8,000. These liquid polymers may be cured to solid elastomeric materials with a variety of curing agents including lead dioxide. The cured polymers in combination with various fillers, pigments, plasticizers, etc. are useful as, among other things, sealants and caulking materials. Because of the relatively high degree of chemical reactivity between the liquid polymers and curing agents such as lead dioxide, however, it is necessary, for a good many end use applications, to package the liquid polymers and the curing agents separately, as a so-called two package system, in order to prevent a premature reaction occurring between the two materials. The end user of the two package system, therefore, is responsible for uniformly blending the two parts of the system together to obtain consistent and desirable results. To facilitate the homogeneous blending of the two packages together and to aid in the obtaining of the desired end results, the ingredients of two packages systems are so prepackaged that the desired ratios of liquid polymer, filler, plasticizer, curing agents, pigment, etc. are conveniently proportioned between the two parts of the package with the proviso, of course, that complementarily reactive materials are kept apart in separate package components until the whole system is to be blended together. The curing agent, for example, is packaged separately from the liquid polymer in the form of a curing paste composition with some or all of the filler and/or plasticizer, etc., intended for the needs of the entire two package system. Curing pastes based on lead dioxide, however, among others, have a very poor shelf life which seriously detracts from the use of lead dioxide as a curing agent for storable two package liquid polysulfide systems. It has been found that upon storage of the curing paste and its subsequent use that the pot life of the blended two package system gets progressively worse. By pot life is meant that span of time beginning when the components of a curable liquid polymer system are blended together (i.e., polymer, filler, plasticizer, curing agent, etc.) and during which the blended system remains in a workable or manipulative state as the cure of the polymer progresses. It ends when the system becomes unworkable. Depending upon the end use application, a blend of polymer, curing agent, etc. should have a known pot life of about 15 minutes to several hours. If the pot life of the system is either unknown, too short, too long, unreliable or nonexistent, for specific applications the utility of the system may be seriously impaired if not completely destroyed.

An object of the present invention therefore is to provide storage stable curing pastes for liquid polysulfide polymers which will impart a reliable and reproducible pot life to curable polysulfide systems made therewith.

A further object of the present invention is to provide such storage stable curing pastes in which inorganic curing agents are employed.

A still further object of the present invention is to provide a means for imparting a specifically desired pot life to a blended curable liquid polysulfied polymer-curing paste system.

A still further object of the present invention is to provide novel, curable polysulfide liquid polymer-stable curing paste compositions having consistent pot life values.

A still further object of the present invention is to provide a process for stabilizing polysulfide liquid polymer curing paste compositions.

It has now been found, according to the present invention, that storage stable curing pastes based on lead dioxide can be formulated to provide curable polysulfide-curing paste systems made therewith with reliable and reproducible pot life values if activated alumina is compounded with the customarily employed components of the curing pastes. The exact reason for the stablization by the activated alumina during the storage of the curing paste is not fully known. According to the present invention; to be storage stable a curing paste should contain, per 47 to 51 parts by weight of curing agent present therein, about 1.0 to 5 parts by weight of activated alumina. Generally, the more activated alumina used in the curing paste, the shorter will be the resulting pot life of the blend of liquid polymer and curing paste, all other factors remaining the same. A paste containing 1.0 to 5 parts by weight of activated alumina may also contain about 0.0 to 1.0 part by weight of one or more fatty acids or their lead salts which act as a cure retarder, as well as about 10 to 45 parts by weight of one or more hydrophobic plasticizers.

The novel cured rubbers obtained through the use of the present stable curing pastes show at least as good physical properties as those which may be obtained when curing pastes of the prior art are used.

The plasticizer(s) used in the curing pastes should be an inert and preferably neutral liquid material that is substantially hydrophobic in nature. It has been found, according to the present invention, that the choice of hydrophobic plasticizer employed in the curing paste also has a profound effect on the pot life of the blended curable polysulfide systems made therewith. Thus merely by changing the type of plasticizer used as a part of the present curing pastes, one can effect large changes in the pot life of the present curable compositions, from plasticizer to plasticizer, and thereby provide the practitioner with a flexibility in usage of the present curing pastes suitable for many diverse end-use applications. Among the hydrophobic plasticizers which may usefully be employed as components in the present curing pastes may be included dibenzyl phthalate, phenyl cresyl phthalate, phenyl benzyl phthalate, butyl benzyl phthalate, dibutyl phenyl phosphate, tricresyl phosphate, butyl cyclohexyl phthalate, triphenyl phosphate, dibutyl phthalate, phenyl dicresyl phosphate, isooctyl diphenyl phosphate, di-2-ethylhexyl phenylphosphate, diphenyl phthalate, dipropylene glycol dibenzoate, dibenzyl adipate, isodecyl diphenyl phosphate, isodecyl dicresyl phosphate, butyl octyl) phosphate, tri-n-hexyl phosphate, butyl decyl phthalate, diisoctyl phthalate, di-2-ethylhexyl phthalate, di-n-octyl phthalate, di-n-octyl phenyl phosphate, di-2-ethylhexyl isophthalate, dibutoxyethyl adipate, dicapryl phthalate, diisodecyl phthalate, di-2-ethylhexyl hexahydrophthalate, di-n-nonyl phthalate, di-2-ethylhexyl terephthalate, hydrogenated terphenyl, di-n-decyl phthalate, dioctyl adipate, di-2-ethylhexyl azelate, alkyl aromatic hydrocarbons, ditridecyl phthalate, di-2-ethylhexyl sebacate, diisodecyl adipate, di-n-decyl adipate, dibutyl carbitol formal, dibutyl carbitol adipate and castor oil.

It has also been found according to the present invention that the pot life of the blend of polysulfide polymer and curing paste is not only a function of the amount of curing agent and/or type and quantity of plasticizer employed in the curing paste but that the size of the granules of the solid curing agent employed in the curing paste also has a decided effect upon the pot life of the curable compositions. The finer the particle size of the solid curing agents employed, such as lead dioxide, all other factors remaining the same, the shorter is the pot life of the blend of polysulfide polymer and curing paste. A relatively large average particle size according to the present invention in this regard is about $0.75\mu$ in diameter and a relatively small average particle size is about $0.35\mu$.

In preparing the curing pastes of the present invention the components thereof need only be homogeneously blended together, such as on a paint mill, and then packaged, preferably in air tight containers.

The problem of storage stability also exists for curing pastes based on curing agents other than lead dioxide. Among these are curing pastes which employ as their active cure agents inorganic oxides such as ZnO, PbO, MgO, CaO, BaO, FeO, $Fe_2O_3$, CoO and CuO; inorganic peroxides such as $ZnO_2$, $MgO_2$, $CaO_2$, $MnO_2$, $TeO_2$, $SeO_2$, $FeO_2$, $As_2O_3$, $Sb_2O_3$, $Sb_2O_5$, $SnO_2$ and $Pb_3O_4$; and inorganic oxidizing agents such as $Na_2CrO_4$, $K_2CrO_4$, $Na_2Cr_2O_7$, $K_2Cr_2O_7$ and $(NH_4)_2Cr_2O_7$. It is within the concept of this invention that if activated alumina is included as a part of the paste formulation, that stability on storage of pastes prepared from the foregoing curing agents is provided in such manner that essentially constant and predictable pot life values for curable polysulfide compositions are thereby obtained. Of course, the exact quantities of activated alumina to be used in any specific formulation will vary depending upon the types and amounts of curing agents used as well as upon the nature and quantity of the adjuvants such as plasticizers employed therein.

The following specific example are merely illustrative of the present invention and are not intended as a limitation upon the scope thereof.

EXAMPLE 1

A comparison is made in this example between the pot life values of two curable polysulfide compositions produced with two curing pastes, one composition prepared with a curing paste of this invention containing activated alumina, and the other prepared with a curing paste of the prior art.

*Preparation of the curing pastes*

The components of the curing pastes were uniformly admixed on a paint mill in two passes and according to the recipe

| Curing Paste | 1.1 | 1.2 |
| --- | --- | --- |
| Component, in pbw.: | | |
| Lead dioxide, $0.5\mu$ (92% $PbO_2$) | 49.0 | 49.0 |
| Double pressed stearic acid [1] | 0.7 | 0.7 |
| HB-40 Plasticizer [2] | 30.0 | 30.0 |
| Activated alumina, 80–200 Mesh | 1.5 | |

[1] Double pressed stearic acid is a mixture of fatty acids: approximately 52% palmitic, 39% stearic, 4% oleic, 2.5% myristic, 2% magaric and 0.5% pentadecyclic acids.
[2] HB-40 is a mixture of partially hydrogenated terphenyls.

The curing pastes 1.1 and 1.2 were then packaged and stored at ambient temperatures in a number of closed glass jars to be tested from time to time as indicated below.

*Testing curing pastes 1.1 and 1.2*

Nine parts by weight of each of curing pastes 1.1 and 1.2 were blended with 100 p.b.w. of LP-2 polysulfide liquid polymer (Thiokol) (a mercaptan terminated polymer having a backbone of the repeating units ($-C_2H_4-O-CH_2-O-C_2H_4SS-$) with about 2% crosslink and an average molecular weight of 4,000) prior to test by mixing for about 5 minutes. These test mixtures were prepared at various intervals during the storage (at ambient temperature) of the pastes as indicated in the table below, and evaluated as to pot life. The viscosity of the test mixtures were measured as an indication of pot life at 50% relative humidity $\pm 5\%$ and $80\pm 2°$ F. using a Brookfield viscometer with spindle speed of 4 and spindle size No. 7. The time required for the test compositions to thicken to 5,000 poise was taken as the pot life value for the curable polysulfide compositions being tested and is listed as such in the table below.

POT LIFE OF CURABLE MIXTURES WITH STORAGE TIME OF CURING PASTES

| Paste Storage Time, In Days | Pot Life of Curable Mixtures, in Minutes, When Made With— | |
| --- | --- | --- |
| | Curing Paste 1.1 | Curing Paste 1.2 |
| 1 | 84 | 258 |
| 5 | 86 | |
| 6 | | 270 |
| 7 | 76 | |
| 8 | | 260 |
| 12 | 87 | |
| 13 | | 249 |
| 14 | 88 | |
| 15 | | 250 |
| 19 | 89 | |
| 20 | | 203 |
| 21 | 90 | |
| 22 | | 196 |
| 26 | 82 | |
| 27 | | 200 |
| 28 | 77 | |
| 29 | | 175 |
| 33 | 89 | |
| 35 | 86 | |
| 57 | | 162 |
| 62 | | 122 |
| 63 | 85 | |
| 68 | 86 | |

In each instance the curable compositions cured to form rubbers with good physical properties.

The inconsistent and unpredictable pot life values for curable compositions prepared with curing paste 1.2 after different periods of storage as shown detracts seriously from the usefulness of such prior art curing compositions, whereas, when activated alumina was included in the formulation, predictable and consistent pot life values were obtained.

EXAMPLE 2

The effect on pot life of curable polysulfide compositions due to use of different plasticizers in the curing pastes of the present invention is examined in this example.

The curing pastes and curable polysulfide compositions were prepared and tested as in Example 1. The pot life values of these compositions are given in the table below. The stability of the pot life values of these compositions was examined using an accelerated aging test wherein the pot life values of cure compositions made with freshly prepared curing pastes were compared with pot life values for curable compositions prepared with curing pastes that had been heat aged in a closed container for 24 hours at 130° F. prior to admixture in the cure composition. The close correlation of the two sets of values points up the high degree of storage stability obtainable with the various pastes of this invention.

| Test | 2.1 | 2.2 | 2.3 | 2.4 | 2.5 | 2.6 |
|---|---|---|---|---|---|---|
| Curing Paste Recipe, in pbw.: | | | | | | |
| Lead dioxide, 0.5μ, 92% PbO₂ | 49.0 | 49.0 | 49.0 | 49.0 | 49.0 | 49.0 |
| Double pressed stearic acid | 0.7 | 0.7 | 0.7 | 0.7 | 0.7 | 0.7 |
| Activated alumina, 80–200 mesh | 1.6 | 1.6 | 1.6 | 1.6 | 1.6 | 1.6 |
| HB-40 plasticizer | 35.0 | | | | | |
| Aroclor 1232 [1] | | 35.0 | | | | |
| Dibutyl phthalate | | | 35.0 | | | |
| TP-95 plasticizer [2] | | | | 35.0 | | |
| Dioctyl phthalate | | | | | 35.0 | |
| Castor Oil | | | | | | 35.0 |
| Curable Composition Recipe, in pbw.: | | | | | | |
| LP-2 polysulfide polymer | 100 | 100 | 100 | 100 | 100 | 100 |
| Curing paste | 9 | 9 | 9 | 9 | 9 | 9 |
| Pot Life Values, in hours (') and minutes (''): | | | | | | |
| Initial | 30'' | 3'22'' | 40'' | 12'' | 42'' | 14'' |
| After heat aging of the curing paste | 30'' | 3'36'' | 43'' | 14'' | 45'' | 12'' |

[1] Aroclor 1232 is a chlorinated biphenyl containing 32% chlorine.
[2] TP-95 plasticizer is dibutyl carbitol adipate.

In each instance, the curable compositions cured to form rubbers with good physical properties.

EXAMPLE 3

The effect on pot life of curable polysulfide compositions due to the use of curing agents of different average particle in the curing pastes of the present invention is examined in this example.

The curing pastes and curable polysulfide compositions were prepared and tested as in Example 1. The stability of the pot life values imparted to the cure compositions by the pastes was also examined, using the accelerated aging test as described in Example 2. Close correlation of the two sets of values for initial and heat aged pot life indicate storage stability for the various pastes of this invention.

| Test | 3.1 | 3.2 | 3.3 | 3.4 |
|---|---|---|---|---|
| Curing Paste Recipe, in pbw.: | | | | |
| Lead dioxide, 92% PbO₂ of— | | | | |
| 0.35μ (average particle size) | 49.0 | | | |
| 0.50μ (average particle size) | | 49.0 | | |
| 0.55μ (average particle size) | | | 49.0 | |
| 0.65μ (average particle size) | | | | 49.0 |
| Double pressed stearic acid | 0.7 | 0.7 | 0.7 | 0.7 |
| Activated alumina, 80–200 mesh | 1.5 | 1.5 | 1.5 | 1.5 |
| HB-40 plasticizer | 35.0 | 35.0 | 35.0 | 35.0 |
| Curable Composition Recipe, in pbw.: | | | | |
| LP-2 polysulfide polymer | 100 | 100 | 100 | 100 |
| Curing paste | 9 | 9 | 9 | 9 |
| Pot Life Values, in hours (') and minutes (''): | | | | |
| Initial | 20'' | 2'47'' | 3'17'' | 9'25'' |
| After heat aging of the curing paste | 19'' | 2'32'' | 3'11'' | 9'30'' |

In each instance the curable compositions cured to form rubbers with good physical properties.

EXAMPLE 4

The effect on the pot life of curable polysulfide compositions due to the use of different quantities of fatty acid cure retarders in the curing pastes of the present invention is compared in this example. The preparative, cure and test procedures of Example 2 were followed.

| Test | 4.1 | 4.2 |
|---|---|---|
| Curing Paste Recipe, in pbw.: | | |
| Lead dioxide, 0.5μ, 92% PbO₂ | 49.0 | 49.0 |
| Double pressed stearic acid | 0.60 | 0.65 |
| Activated alumina | 1.2 | 1.2 |
| HB-40 plasticizer | 15 | 15 |
| Curable Composition Recipe, in pbw.: | | |
| LP-32 polysulfide polymer [1] | 100 | 100 |
| Curing paste | 9 | 9 |
| Pot Life Values, in minutes: | | |
| Initial | 55 | 108 |
| After heat aging of the curing paste | 57 | 112 |

[1] LP-32 polysulfide polymer is similar to LP-2 polysulfide polymer, except that it has only a 0.5% crosslink rather than 2.0% crosslink.

In each instance the curable compositions cured to form rubbers with good physical properties.

EXAMPLE 5

In this example a curing paste having a composition identical to that of Curing Paste 1.1 of Example 1 was used, except that 4 p.b.w. of activated alumina was used rather than 1.5 as listed therein. The preparation, cure and testing procedures described in Example 2 were used to give an initial and an aged pot life value of about 40 minutes.

The curable composition used herein cured within one hour to form a rubber of good physical properties.

I claim:

1. A liquid polysulfide polymer curing paste comprising, in weight ratio, 47 to 51 parts by weight of inorganic oxidizing curing agent for the cure of said polymer, about 10 to 45 parts by weight of at least one inert, neutral, liquid, hydrophobic plasticizer and about 1 to 5 parts by weight of activated alumina.

2. A curing paste as in claim 1 in which said curing agent is lead dioxide.

3. A curing paste as in claim 2 in which said lead dioxide is a granular material having an average grain size of about 0.35μ to 0.75μ.

4. A curing paste as in claim 1 in which at least one of said plasticizers is castor oil.

5. A curing paste as in claim 1 in which at least one of said plasticizers is dioctyl phthalate.

6. A curing paste as in claim 1 in which at least one of said plasticizers is dibutyl phthalate.

7. A curing paste as in claim 1 in which at least one of said plasticizers is dibutyl carbitol adipate.

8. A curing paste as in claim 1 in which at least one of said plasticizers is a chlorinated biphenyl.

9. A curing paste is in claim 1 in which at least one of said plasticizers is a hydrogenated terphenyl.

10. A curing paste as in claim 1 further comprising, in weight ratio, about 0.5 to 1 part by weight of fatty acid.

11. A curing paste as in claim 10 in which said fatty acid is stearic acid.

12. A liquid polysulfide polymer curing paste comprising, in weight ratio, 47 to 51 parts by weight of lead dioxide, about 10 to 45 parts by weight of at least one inert, neutral, liquid, hydrophobic plasticizer, and about 1 to 5 parts by weight of activated alumina.

13. A liquid polysulfide polymer curing paste comprising, in weight ratio, 47 to 51 parts by weight of lead dioxide, about 10 to 45 parts by weight of at least one inert, neutral, liquid, hydrophobic plasticizer, about 0.5 to 1 part by weight of fatty acid and about 1 to 5 parts by weight of activated alumina.

14. A liquid polysulfide polymer curing paste comprising, in weight ratio, 47 to 51 parts by weight of lead dioxide, about 10 to 45 parts by weight of at least one inert, neutral, liquid, hydrophobic plasticizer, about 0.5 to 1 part by weight of stearic acid and about 1 to 5 parts by weight of activated alumina.

References Cited

UNITED STATES PATENTS

| 3,036,049 | 5/1962 | Leuchten et al. | 260—37 X |
| 3,114,723 | 12/1963 | Hunter | 260—37 X |
| 3,207,696 | 9/1965 | Shephard et al. | 252—186 |
| 3,225,017 | 12/1965 | Seegman et al. | 260—79.1 |

LEON D. ROSDOL, *Primary Examiner.*

M. WEINBLATT, *Assistant Examiner.*